(12) United States Patent
Patro

(10) Patent No.: US 9,071,519 B1
(45) Date of Patent: Jun. 30, 2015

(54) SYSTEM, METHOD, AND COMPUTER PROGRAM FOR RATING NETWORK TRANSMISSIONS BASED ON USER REQUESTED DATA

(75) Inventor: Debabrata Patro, Pune (IN)

(73) Assignee: Amdocs Software Systems Limited, Dublin (IE)

( * ) Notice: Subject to any disclaimer, the term of this patent is extended or adjusted under 35 U.S.C. 154(b) by 809 days.

(21) Appl. No.: 13/045,471

(22) Filed: Mar. 10, 2011

(51) Int. Cl.

| | |
|---|---|
| *G06F 15/173* | (2006.01) |
| *H04L 12/26* | (2006.01) |
| *H04M 15/00* | (2006.01) |
| *H04L 12/14* | (2006.01) |
| *H04N 21/24* | (2011.01) |
| *G06Q 30/04* | (2012.01) |
| *G06Q 20/08* | (2012.01) |
| *H04N 21/81* | (2011.01) |
| *H04N 21/462* | (2011.01) |
| *G06Q 30/02* | (2012.01) |
| *G06Q 20/10* | (2012.01) |

(52) U.S. Cl.
CPC ........... *H04L 43/0876* (2013.01); *H04M 15/80* (2013.01); *H04L 12/1417* (2013.01); *H04L 12/1471* (2013.01); *H04L 12/1432* (2013.01); *H04M 15/60* (2013.01); *H04M 15/58* (2013.01); *H04M 15/82* (2013.01); *H04M 2215/0152* (2013.01); *H04M 2215/22* (2013.01); *H04N 21/812* (2013.01); *H04N 21/4622* (2013.01); *H04N 21/2402* (2013.01); *G06Q 30/04* (2013.01); *G06Q 30/02* (2013.01); *G06Q 30/0251* (2013.01); *G06Q 30/0277* (2013.01); *G06Q 30/0274* (2013.01); *G06Q 30/0273* (2013.01); *G06Q 20/085* (2013.01); *G06Q 20/102* (2013.01)

(58) Field of Classification Search
CPC ............. G06Q 30/02; G06Q 30/0277; G06Q 30/0273; G06Q 30/0274; G06Q 30/04; G06Q 30/0251; G06Q 20/085; G06Q 20/102; H04L 43/0876; H04L 12/1417; H04L 12/1432; H04L 12/1471; H04M 15/58; H04M 15/60; H04M 15/80; H04M 15/82; H04M 2215/0152; H04M 2215/22; H04N 21/2402; H04N 21/4622; H04N 21/812
USPC ............. 709/224, 218, 219; 705/14.4, 14.49, 705/14.73, 40, 400; 725/32
See application file for complete search history.

(56) References Cited

U.S. PATENT DOCUMENTS

| | | | |
|---|---|---|---|
| 7,389,116 B1 * | 6/2008 | Patro | 455/466 |
| 7,599,288 B2 | 10/2009 | Cole et al. | |
| 7,873,152 B1 * | 1/2011 | Patro | 379/121.02 |
| 8,341,044 B1 * | 12/2012 | Patro et al. | 705/34 |
| 8,380,593 B1 * | 2/2013 | Patro et al. | 705/34 |
| 8,401,937 B1 * | 3/2013 | Patro et al. | 705/34 |
| 2004/0068447 A1 | 4/2004 | Mao et al. | |
| 2004/0076298 A1 * | 4/2004 | Oliver | 380/231 |
| 2004/0266394 A1 * | 12/2004 | Mizell et al. | 455/408 |
| 2005/0027821 A1 * | 2/2005 | Alexander et al. | 709/218 |

(Continued)

*Primary Examiner* — Oleg Survillo
(74) *Attorney, Agent, or Firm* — Zilka-Kotab, PC

(57) ABSTRACT

A system, method, and computer program product are provided for rating network transmissions based on user requested data. In use, a transmission of data over a network is identified, where the data includes user requested data and additional data. Additionally, a size of the user requested data is determined. Furthermore, the transmission of the user requested data is rated based on the size of the user requested data. The transmission of additional data may be charged to third parties such as advertisers.

14 Claims, 5 Drawing Sheets

(56) References Cited

U.S. PATENT DOCUMENTS

| | | | |
|---|---|---|---|
| 2006/0045246 A1* | 3/2006 | Pettinelli et al. | 379/114.01 |
| 2006/0058010 A1* | 3/2006 | Williams et al. | 455/414.1 |
| 2007/0107019 A1* | 5/2007 | Romano et al. | 725/80 |
| 2008/0034386 A1* | 2/2008 | Cherry et al. | 725/35 |
| 2008/0263137 A1* | 10/2008 | Pattison et al. | 709/203 |
| 2008/0301317 A1* | 12/2008 | Lee et al. | 709/231 |
| 2009/0076914 A1* | 3/2009 | Coueignoux | 705/14 |
| 2009/0293067 A1* | 11/2009 | Singh et al. | 719/318 |
| 2010/0144310 A1* | 6/2010 | Bedingfield et al. | 455/405 |
| 2010/0318647 A1* | 12/2010 | Savoor et al. | 709/224 |
| 2011/0082755 A1* | 4/2011 | Itzhak | 705/14.69 |
| 2011/0173249 A1* | 7/2011 | Lee et al. | 709/203 |
| 2012/0089781 A1* | 4/2012 | Ranade et al. | 711/118 |
| 2012/0115434 A1* | 5/2012 | Lazaridis | 455/406 |
| 2012/0116883 A1* | 5/2012 | Asam et al. | 705/14.58 |
| 2012/0239805 A1* | 9/2012 | Savoor et al. | 709/224 |
| 2013/0013533 A1* | 1/2013 | Agarwal et al. | 705/400 |
| 2013/0317984 A1* | 11/2013 | O'Leary et al. | 705/40 |
| 2013/0339161 A1* | 12/2013 | van Riel | 705/14.73 |
| 2014/0059668 A1* | 2/2014 | Holloway et al. | 726/12 |
| 2014/0156405 A1* | 6/2014 | Ganz et al. | 705/14.55 |

* cited by examiner

SYSTEM, METHOD, AND COMPUTER PROGRAM FOR RATING NETWORK TRANSMISSIONS BASED ON USER REQUESTED DATA

FIELD OF THE INVENTION

The present invention relates to network transmissions of data, and more particularly to rating network transmissions of data.

BACKGROUND

Generally, transmissions of data over a network are rated for billing purposes. For example, network subscribers are charged for the rate given to the data transmission. In some situations, network transmissions are rated based on the access method used to transmit the data [e.g. digital subscriber lines (xDSL), evolution-data optimized (EVDO)] and/or a speed of the connection used to transmit the data. However, rating based on a volume of the data included in the network transmission is becoming more predominant.

Unfortunately, techniques for rating network transmissions based on volume have exhibited various limitations. Just by way of example, volume based rating has typically resulted in subscribers being charged for data they have not specifically requested, particularly where additional data (e.g. advertisements, etc.) is automatically transmitted along with the user requested data. There is thus a need for addressing these and/or other issues associated with the prior art.

SUMMARY

A system, method, and computer program product are provided for rating network transmissions based on user requested data. In use, a transmission of data over a network is identified, where the data includes user requested data and additional data. Additionally, a size of the user requested data is determined. Furthermore, the transmission of the user requested data is rated based on the size of the user requested data.

DETAILED DESCRIPTION

Figure 1:
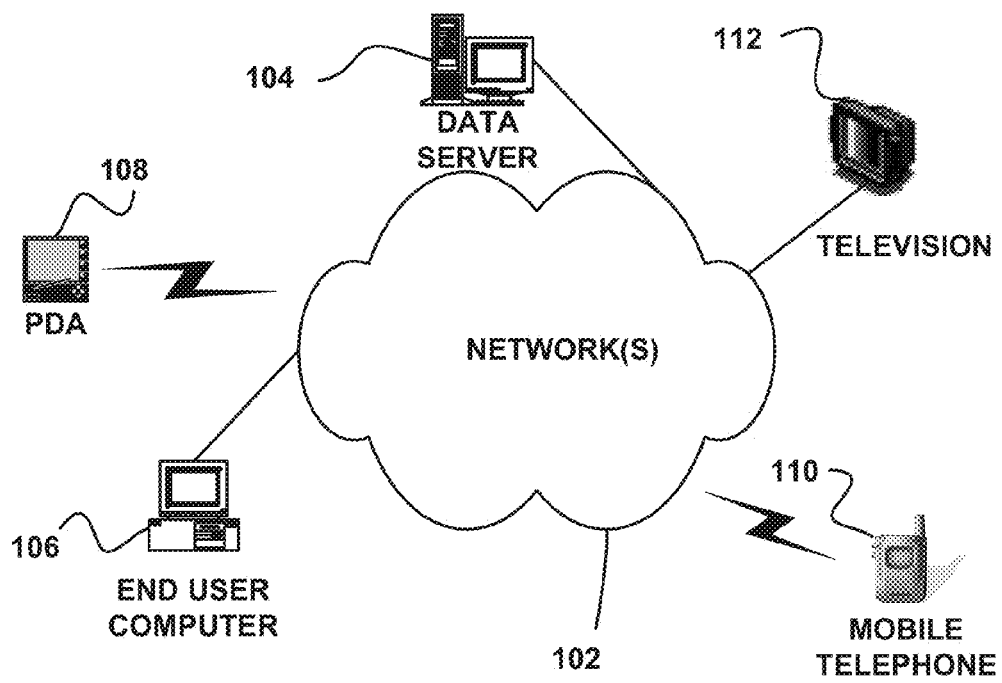
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
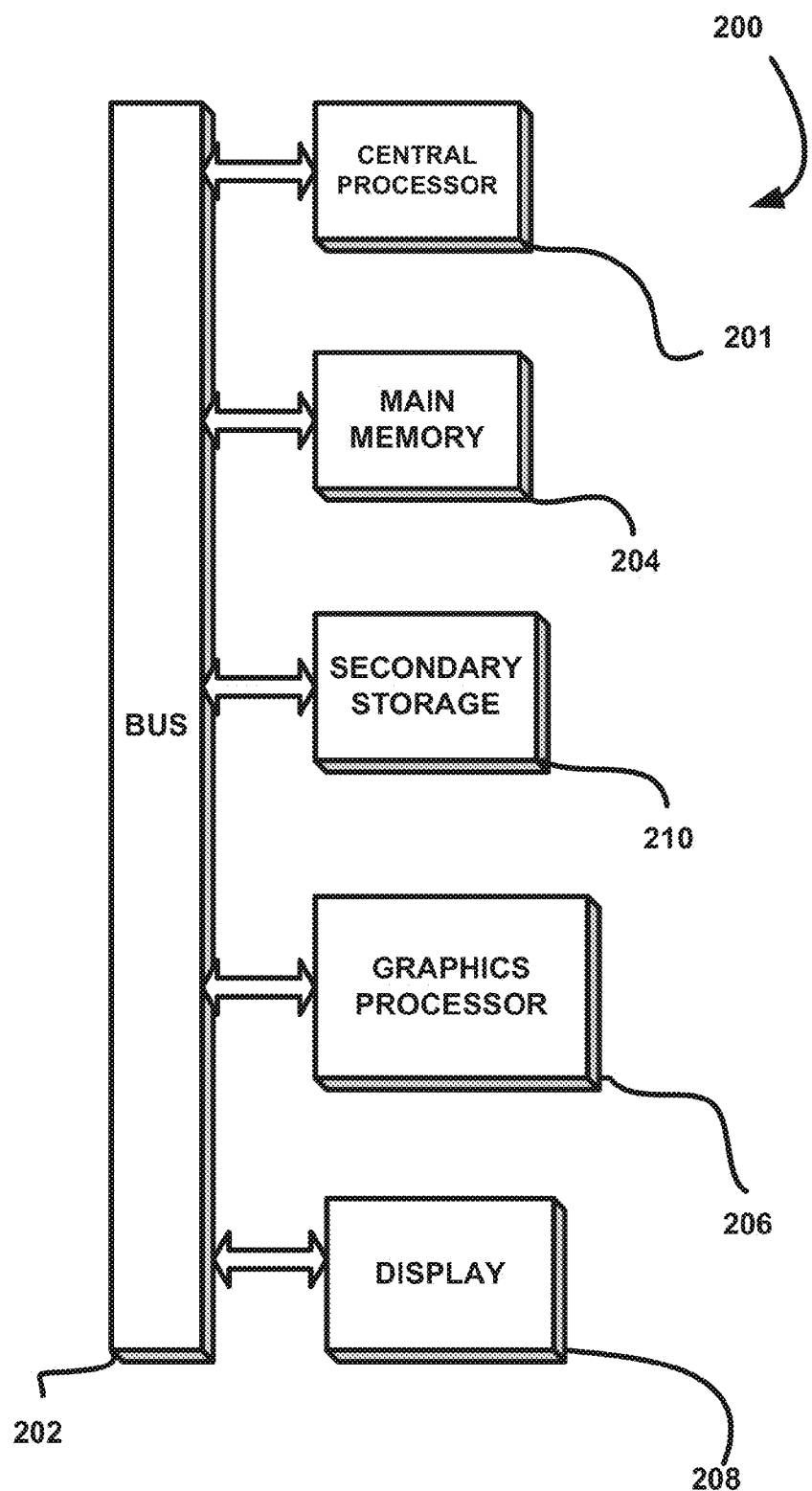
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
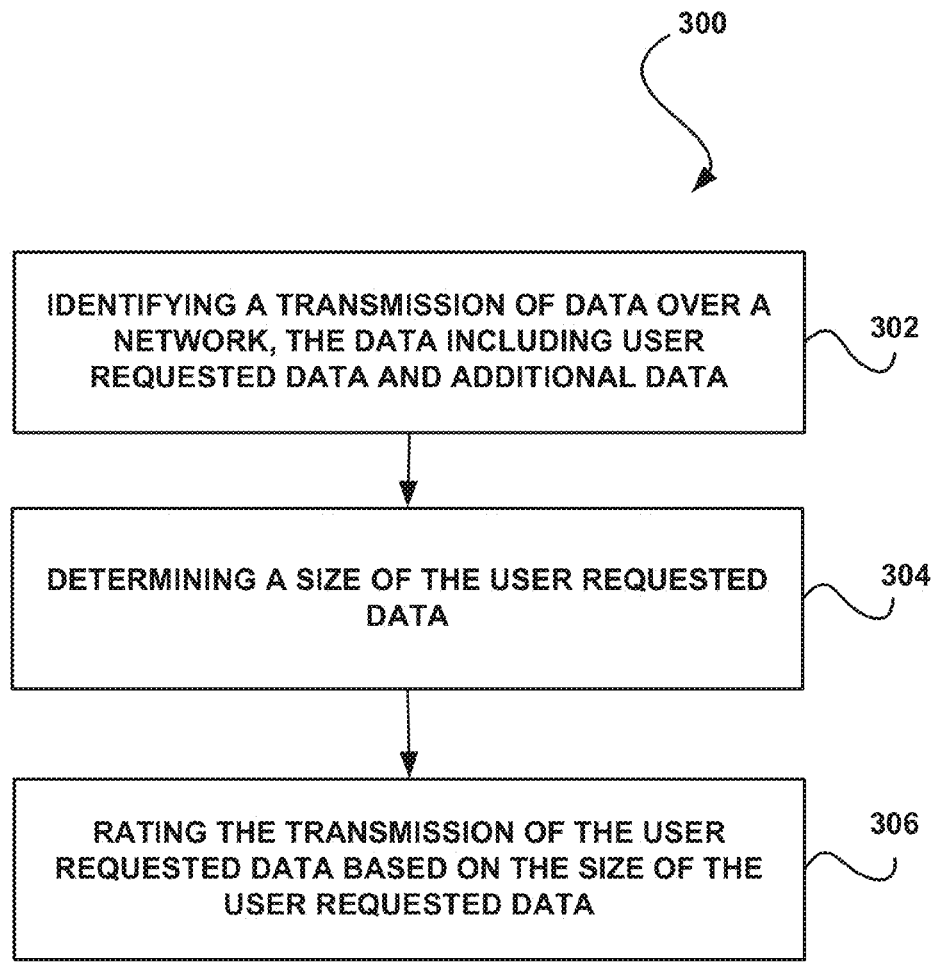
FIG. 3 illustrates a method for rating network transmissions based on user requested data, in accordance with an embodiment.

FIG. 3 illustrates a method 300 for rating network transmissions based on user requested data, in accordance with an embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a transmission of data over a network is identified, where the data includes user requested data and additional data. In the context of the present embodiment, the data includes any data capable of being transmitted over the network, which includes both user requested data and additional data.

In one embodiment, the user requested data may include a component of data requested by a user via a browser of a device of the user (e.g. where the user is a subscriber to the network). Just by way of example, the user requested data may include a web page, video, audio, and/or any other data (e.g. file, code, etc.) which may be requested by a user. Optionally, the user requested data may be transmitted by a source (e.g. server, etc.) from which the user requested the user requested data.

In another embodiment, the additional data may include a component of data not necessarily requested by the user. For example, the data not requested by the user may include an advertisement, a tracking cookie, a tracking uniform resource locator (URL), a toolbar, and/or any other data (e.g. file, code, etc.) which is transmitted with the user requested data (e.g. but not necessarily requested by the user). As an option, the additional data may be transmitted by a second source separate from the source (e.g. server, etc.) from which the user requested the user requested data, such as from an advertiser.

It should be noted that the transmission of the data may include any communication of the data over the network. For example, the transmission of the data may include downloading the data, streaming the data, uploading the data, emailing the data, etc. Thus, the data may optionally be transmitted in response to a user request to receive the user requested data or a user request to send the user requested data.

To this end, the transmission of the data may be identified in response to initiation of the transmission resulting from a request by the user for the user requested data. For example, the transmission of the data may be identified by a network service provider receiving the data for transmitting the same. In this way, the network service provider may intercept the transmission of the data from a source location to a destination location.

Additionally, as shown in operation 304, a size of the user requested data is determined. In the context of the present description, a size includes a magnitude of data (e.g. in kilobytes, megabytes, etc.). In one embodiment, the size of the user requested data may be determined by analyzing the data. In another embodiment, the size of the user requested data may be determined by analyzing content returned from the source from which the user requested data has been requested, where such content is to be forwarded to the device of the user.

Furthermore, as shown in operation 306, the transmission of the user requested data is rated based on the size of the user requested data. With respect to the present description, the rating includes determining a rate for the transmission of the user requested data. Such rate may be a monetary rate or any other value indicative of a rate of the transmission of the user requested data.

It should be noted that the rate may be determined utilizing any desired algorithm that takes into account the size of the user requested data. For example, in one embodiment, the rate may be higher for user requested data that is of a first size, and may be lower for user requested data that is of a second size less than the first size. In another embodiment, the rate may be determined based on a tiered rating system, where tiers of different size ranges are associated with different rates.

Accordingly, the user from which the user requested data was requested may be charged for the transmission, utilizing the rating of the transmission of the user requested data. In one embodiment, the rate determined for the transmission of the user requested data may be billed to the user. For example, the network service provider may determine the rate and charge the user using the rate.

By rating the transmission of the user requested data/additional data based on the size of the user requested data, the rating may be exclusive of a size of the additional data included in the transmission. Thus, the rating may be exclusive of a size of data not necessarily requested by the user, such that the user may optionally only be charged for the data the user has requested. In this way, the user may optionally be charged only for the transfer of that component of data that has been specifically requested by the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
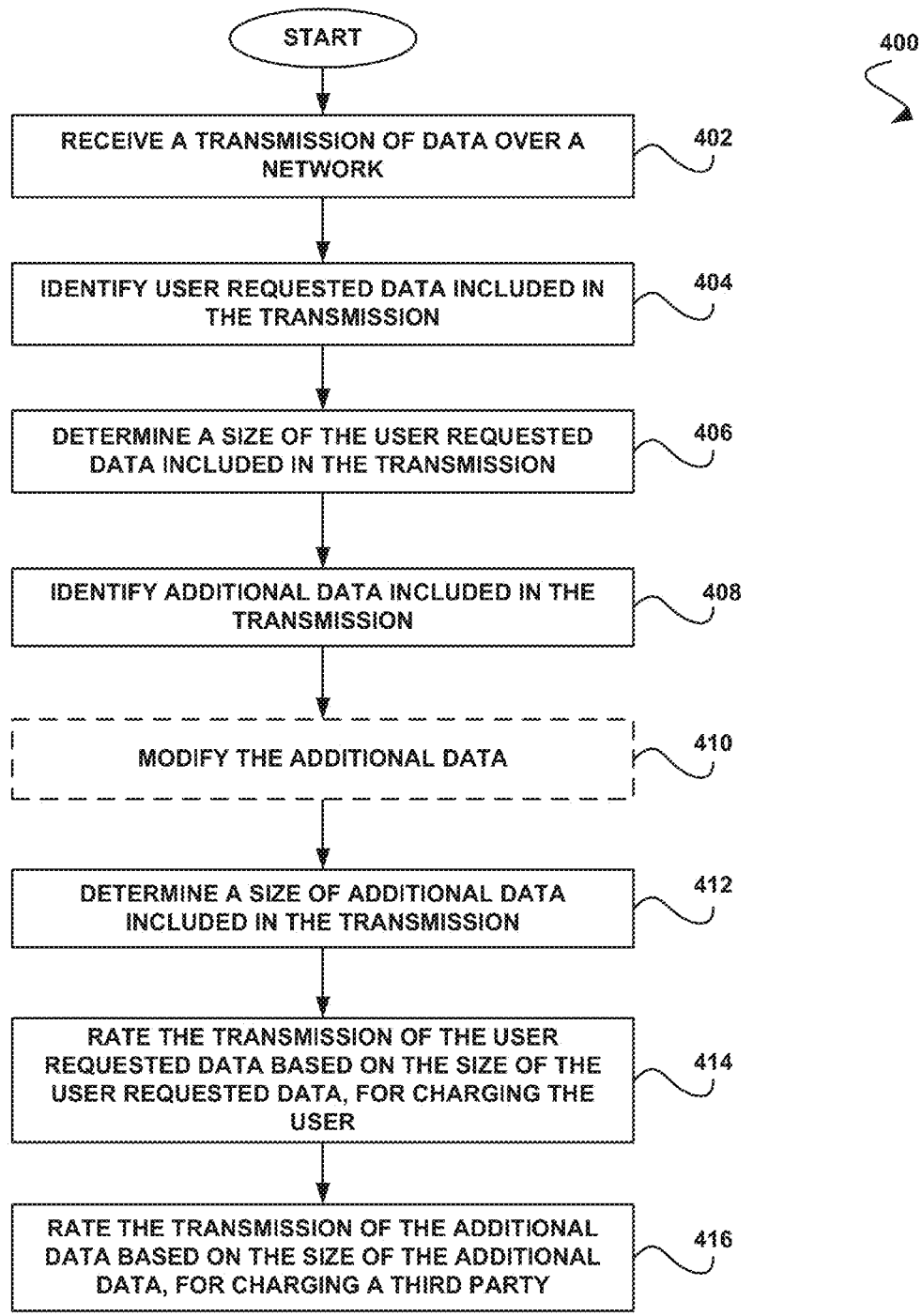
FIG. 4 illustrates a method for separately rating user requested data and additional data included therewith in a network transmission, in accordance with another embodiment.

FIG. 4 illustrates a method 400 for separately rating user requested data and additional data included therewith in a network transmission, in accordance with another embodiment. As an option, the method 400 may be carried out in the context of the details of FIGS. 1-3. Of course, however, the method 400 may be carried out in any desired environment. Again, the aforementioned definitions may equally apply to the description below.

As shown in operation 402, a transmission of data over a network is received. With respect to the present embodiment, the data includes both user requested data and additional data which has not necessarily been requested by a user. For example, the data may include a web page, and the additional data may include an advertisement inserted into the web page.

In one embodiment, the transmission of data may be received by a network service provider. For example, the network service provider may intercept the transmission for processing the same (e.g. for billing purposes, etc.), prior to forwarding the transmission to the location to which the transmission is destined.

Additionally, the user requested data included in the transmission is identified. Note operation 404. In one embodiment, the user requested data may be identified in response to receipt of the user requested data from a source from which the user requested the user requested data. For example, the source may respond to the user request by transmitting the user requested data to the user over the network.

As noted above, the network service provider may intercept the transmission for processing the same. Thus, in another embodiment, the user requested data may be identified by analyzing the transmission for the user requested data. Further, a size of the user requested data included in the transmission is identified, as shown in operation 406.

Still yet, as shown in operation 408, additional data included in the transmission is identified. In one embodiment, the additional data may be identified in response to receipt of the additional data from a second source separate from the source from which the user requested the user requested data. For example, the second source may provide the additional data for appending the same to the user requested data.

However, as noted above, the network service provider may intercept the transmission of the user requested data/additional data for processing the same. Accordingly, in another embodiment, the additional data may be identified by analyzing the transmission for the additional data. As an option, the additional data is modified. Note operation 410. It should be noted that the present operation is merely optional, and may include modification of any portion of the additional data.

For example, the additional data may be modified using other additional data. In one embodiment, the other additional data may include data provided by the network service provider. In one embodiment, the additional data may be modified by adding other additional data to the additional data. For example, a wrapper may be added around hyperlinks included in the user requested data/additional data.

In another embodiment, the additional data may be removed from the transmission. In yet another embodiment, the additional data may be replaced with other additional data. For example, an advertisement included in the additional data may be replaced with another advertisement.

Accordingly, in one embodiment, the other additional data may be selected (and appended to the user requested data) based on the size of the user requested data. The selection and appending may be performed in real-time, as an option. To this end, the other additional data may become the additional data to the user requested data.

In particular, the size of the user requested data may be utilized to determine a bandwidth consumed by transmission of the user requested data. In addition, a remaining bandwidth available from a maximum bandwidth capacity may be determined using the determined bandwidth consumed by transmission of the user requested data. In this way, the additional data may be selected based on a determination that the additional data is of a size such that it consumes at most the remaining bandwidth available. For example, a provider for the additional data may be selected based on bids or contracts entered in advance based on the remaining bandwidth available, such that the additional data consumes at most the remaining bandwidth available, and a user segment or user profile.

Just by way of example, the user requested data may be a simple hypertext markup language (HTML) page which uses a small bandwidth for transmission of the same. Thus, an advertisement which uses a larger bandwidth (e.g. a rich-media advertisement) may be selected for being transmitted with the user requested data. This may allow use of the maximum bandwidth capacity when transmitting the user requested data and the additional data together.

Thus, advertisers may select an advertisement to be appended to the user requested data based on the content of the user requested data, a profile of the user, and remaining bandwidth available with respect to transmission of the user requested data. Of course, it should be noted that the selection of an advertisement based on the size of the user requested data may optionally only be provided if the user opts to receive advertisements selected in that manner (e.g. to ensure privacy and compliance with applicable regulations).

Moreover, a size of the additional data is determined, as shown in operation 412. In addition, the transmission is rated based on the size of the user requested data, for charging the user. Note operation 414. In this way, the transmission, which includes both user requested data and additional data not necessarily requested by the user, may only be rated based on the size of the user requested data. As noted above, the user may be charged (i.e. billed) according to the rating.

As also shown, transmission of the additional data is rated based on the size of the additional data, for charging a third party. Note operation 416. For example, an algorithm which takes into account the size of the additional data may be utilized to determine a rate for the transmission of the additional data with the user requested data. As noted above, the rate determined for the transmission of the additional data may be charged to a third party (e.g. the advertiser or other provider of the additional data), such that charging the user for the additional data may be prevented, while still allowing collection of a fee for transmission of the additional data.

Figure 5:
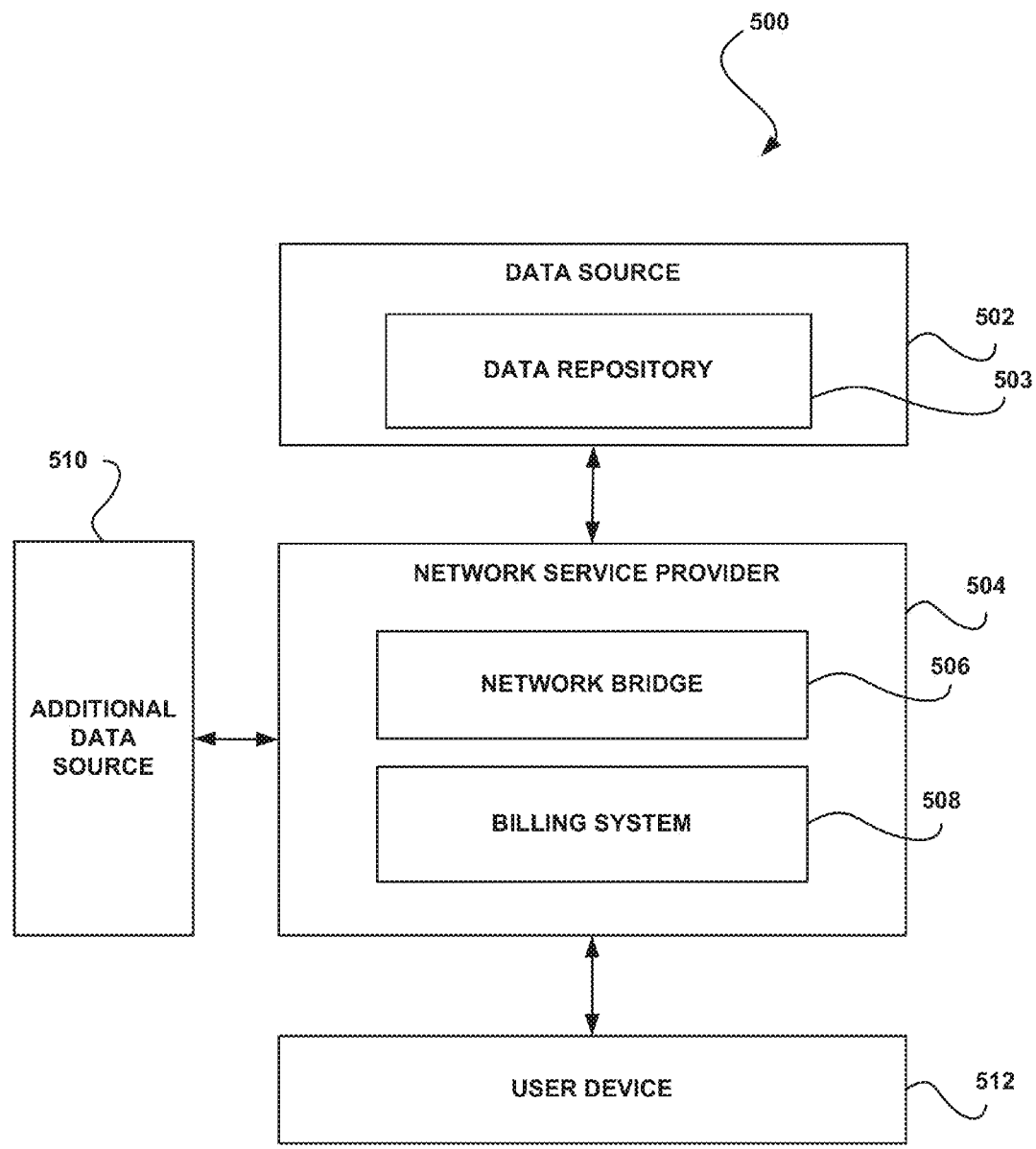
FIG. 5 illustrates a system for rating network transmissions based on user requested data, in accordance with yet another embodiment.

FIG. 5 illustrates a system 500 for rating network transmissions based on user requested data, in accordance with yet another embodiment. As an option, the system 500 may be implemented in the context of the details of FIGS. 1-4. Of course, however, the system 500 may be implemented in any desired environment. Again, the aforementioned definitions may equally apply to the description below.

As shown, a data source 502 and an additional data source 510 are in communication with a user device 512 via a network service provider 504. When the user device 512 submits a request for data (hereinafter user requested data) from the data source 502, the request is received by the network service provider 504 and forwarded to the data source 502. The data source 502 receives the request, retrieves the user requested data from its data repository 503, and responds to the request by returning the user requested data to the user device 512 via the network service provider 504.

As shown, the user requested data is routed through a network bridge 506 of the network service provider 504 (e.g. the Amdocs™ Mobile Internet Bridge). Upon receipt of the user requested data from the data source 502 (for being forwarded to the user device 512), the network bridge 506 analyzes the user requested data and determines the size of the user requested data. The network bridge 506 may then record the size determined for the user requested data.

The network service provider 504 also receives additional data from an additional data source 510 for appending the additional data to the user requested data, such that the user requested data and the additional data may be transmitted to the user device 512 together. In one embodiment, the network bridge 506 may receive the user requested data and the additional data separately. In another embodiment, the network bridge 506 may receive (i.e. from another component of the network service provider 504) the user requested data and the additional data together.

Further, upon receipt of the additional data, the network bridge 506 may modify the additional data. For example, the network bridge 506 may add its own data to the additional data, for appending the same to the user requested data. As another example, the network bridge 506 may replace a portion or all of the additional data with other additional data.

In one embodiment, the network bridge 506 may select an advertisement for inclusion in the additional data (e.g. from the additional data source 510) based on the size of the user requested data. Optionally, selecting the advertisement based on the size of the user requested data may ensure that a bandwidth used by the user requested data and a bandwidth used by the additional data is below or within a predetermined amount below a maximum bandwidth capacity.

The network bridge 506 then sends the size to the billing system 508 of the network service provider 504. The billing system 508 rates the transmission of the user requested data and additional data based on the size of the user requested data. The billing system 508 may then use this rating to bill the user of the user device 512 for the transmission of the user requested data. In this way, billing the user for the additional data appended to the user requested data may be avoided.

The network bridge 506 may then transmit the user requested data and the appended additional data to the user device 512. Where the user has subscribed to a prepaid policy of the network service provider 504, the network bridge 506 may wait for authorization from the billing system 508 to transmit the user requested data and the appended additional data to the user device 512. Once authorization is received (i.e. the billing system 508 determines that there are sufficient funds in an account of the user to pay the rate determined for the transmission), the network bridge 506 may transmit the user requested data and the appended additional data to the user device 512.

The network bridge 506 further determines a size of the additional data and sends the size to the billing system 508 of the network service provider 504. The billing system 508 then rates the transmission of the additional data based on the size of the additional data and any other parameters such as the segment of the user to whom the additional data was transmitted. The billing system 508 may then use this rating to bill the additional data source 510 for the transmission of the additional data. In this way, while billing the user for the additional data appended to the user requested data may be avoided, the network service provider 504 may still collect a fee for the transmission of the additional data (i.e. from the additional data source 510 in the present embodiment).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
intercepting at a network bridge a transmission including user requested data and a first advertisement sent from a first data source to a device of the user over a network;
determining at the network bridge a bandwidth consumed by the transmission of the user requested data;
identifying a maximum bandwidth capacity for the network;
determining a remaining available bandwidth by calculating the difference between the maximum bandwidth capacity for the network and the bandwidth consumed by only the transmission of the user requested data and not the first advertisement;
selecting at the network bridge and from a second data source separate from the first data source a second advertisement, based on a determination that:
  the second advertisement consumes a bandwidth that is within a predetermined amount below the determined remaining available bandwidth,
  the second advertisement is of a type that enables use of the maximum bandwidth capacity, and
  the user has opted to receive advertisements selected based on a size of the user requested data;
removing the first advertisement from the transmission and appending the second advertisement to the user requested data within the transmission;
sending the size of the user requested data from the network bridge to a billing system;
determining at the billing system a rate for the transmission of the user requested data based on the size of the user requested data;
determining at the billing system whether an account of the user contains sufficient funds to pay the rate for the transmission;
sending authorization from the billing system to the network bridge when the billing system determines that the account of the user contains sufficient funds to pay the rate; and
transmitting the user requested data and the second advertisement from the network bridge to the device of the user, in response to the authorization.

2. A system, comprising:
a network bridge including at least one hardware processor configured for:
  intercepting a transmission including user requested data and a first advertisement sent from a first data source to a device of the user over a network;
  determining a bandwidth consumed by the transmission of the user requested data;
  identifying a maximum bandwidth capacity for the network;
  determining a remaining available bandwidth by calculating the difference between the maximum bandwidth capacity for the network and the bandwidth consumed by only the transmission of the user requested data and not the first advertisement;
  selecting and from a second data source separate from the first data source a second advertisement, based on a determination that:
    the second advertisement consumes a bandwidth that is within a predetermined amount below the determined remaining available bandwidth,
    the second advertisement is of a type that enables use of the maximum bandwidth capacity, and
    the user has opted to receive advertisements selected based on a size of the user requested data;
  removing the first advertisement from the transmission and appending the second advertisement to the user requested data within the transmission;
  sending the size of the user requested data to a billing system; and
  transmitting the user requested data and the second advertisement to the device of the user; and
the billing system including at least one hardware processor configured for:
  determining a rate for the transmission of the user requested data based on the size of the user requested data;
  determining whether an account of the user contains sufficient funds to pay the rate for the transmission; and
  sending authorization to the network bridge when the billing system determines that the account of the user contains sufficient funds to pay the rate,
  wherein transmitting the user requested data and the second advertisement from the network bridge to the device of the user is performed in response to the authorization.

3. The system of claim 2, wherein the at least one hardware processor is coupled to a memory via a bus.

4. A computer program embodied on a non-transitory computer readable medium, comprising:
computer code for intercepting at a network bridge a transmission including user requested data and a first advertisement sent from a first data source to a device of the user over a network;
computer code for determining at the network bridge a bandwidth consumed by the transmission of the user requested data;
computer code for identifying a maximum bandwidth capacity for the network;
computer code for determining a remaining available bandwidth by calculating the difference between the maximum bandwidth capacity for the network and the bandwidth consumed by only the transmission of the user requested data and not the first advertisement;
computer code for selecting at the network bridge and from a second data source separate from the first data source a second advertisement, based on a determination that:
  the second advertisement consumes a bandwidth that is within a predetermined amount below the determined remaining available bandwidth,
  the second advertisement is of a type that enables use of the maximum bandwidth capacity, and
  the user has opted to receive advertisements selected based on a size of the user requested data;
computer code for removing the first advertisement from the transmission and appending the second advertisement to the user requested data within the transmission;
computer code for sending the size of the user requested data from the network bridge to a billing system;
computer code for determining at the billing system a rate for the transmission of the user requested data based on the size of the user requested data;
computer code for determining at the billing system whether an account of the user contains sufficient funds to pay the rate for the transmission;
computer code for sending authorization from the billing system to the network bridge when the billing system determines that the account of the user contains sufficient funds to pay the rate; and computer code for transmitting the user requested data and the second advertisement from the network bridge to the device of the user, in response to the authorization.

5. The computer program of claim 4, wherein the transmission includes a downloading of the data.

6. The computer program of claim 4, wherein the transmission includes an uploading of the data.

7. The computer program of claim 4, wherein the user requested data includes data requested by the user via a browser of the device of the user.

8. The computer program of claim 4, wherein the user requested data includes a web page.

9. The computer program of claim 4, further comprising computer code for selecting at the network bridge a tracking cookie for inclusion in the user requested data.

10. The computer program of claim 4, further comprising computer code for charging the user from which the user requested data was requested for the transmission, utilizing the rate for the transmission of the user requested data.

11. The computer program of claim 4, further comprising computer code for rating the transmission of the second advertisement based on the size of the second advertisement.

12. The computer program of claim 11, further comprising computer code for charging the second data source, utilizing the rating of transmission of the second advertisement.

13. The computer program of claim 4, wherein the second advertisement is selected based on contracts entered in advance for purchasing the remaining bandwidth available, as well as a profile of the user.

14. The computer program of claim 4, wherein the second advertisement is selected further based on a content of the user requested data and a profile of the user.

\* \* \* \* \*